United States Patent [19]

Saumweber et al.

[11] Patent Number: 4,640,390
[45] Date of Patent: Feb. 3, 1987

[54] BRAKE LINING CARRIER FOR DISK BRAKES HAVING DIVIDED LINING ELEMENTS

[75] Inventors: Eckart Saumweber, Gauting; Otto Schmitt, Munich, both of Fed. Rep. of Germany

[73] Assignee: Knorr-Bremse AG, Munich, Fed. Rep. of Germany

[21] Appl. No.: 610,655

[22] Filed: May 16, 1984

[30] Foreign Application Priority Data

May 17, 1983 [DE] Fed. Rep. of Germany ....... 3317913

[51] Int. Cl.$^4$ ..................... F16D 55/224; F16D 65/04
[52] U.S. Cl. ............................ 188/73.37; 188/250 E; 188/250 B
[58] Field of Search .................. 188/73.1, 73.2, 250 R, 188/250 C, 250 D, 250 E, 250 F, 250 G, 250 B, 188/234, 240, 242, 251 R, 251 M, 252, 253, 261, 188/205A, 73.37, 73.38; 192/107 R, 107 M; 267/80, 90, 267/103, 141, 153, 181, 182

[56] References Cited
U.S. PATENT DOCUMENTS 2,451,326 10/1948 Eksergian et al. .............. 188/251 R
3,026,224 3/1962 Rogers, Jr. ..................... 267/153 X
3,198,294 8/1965 Stacy ............................ 188/250 E
3,231,256 1/1966 Olson ............................ 267/141 X
3,503,475 3/1970 Mione ............................ 188/250 R

FOREIGN PATENT DOCUMENTS 260807 8/1964 Australia ........................ 188/205 A
2451392 3/1983 Fed. Rep. of Germany .
58-207535 12/1983 Japan ............................. 188/73.37

Primary Examiner—Duane A. Reger
Assistant Examiner—Richard R. Diefendorf
Attorney, Agent, or Firm—Edmund M. Jaskiewicz

[57] ABSTRACT

A brake lining carrier particularly for disk brakes having divided lining elements has a base plate on which is positioned an intermediate plate to support a carrier plate upon which is attached the friction lining. The intermediate plate has a number of indentations which form bulges. Bulges result in a certain degree of elasticity which provides a mobile elastic mounting support for the friction lining which may be made of sintered metal. The result is virtually noiseless braking with uniform surface application and without the generation of "hot spots".

9 Claims, 7 Drawing Figures

BRAKE LINING CARRIER FOR DISK BRAKES HAVING DIVIDED LINING ELEMENTS

The present invention relates to a brake lining carrier for disk brakes having divided lining elements, more particularly, to the elastic mounting and supporting of the brake lining elements on the base plate.

Rail vehicles have been provided with disk brakes having divided lining elements in which a brake lining carrier comprises a base plate on one side of which is a friction brake lining and the other side may be detachably mounted or connected to a brake lining support member which in turn is connected to the brake rigging. The friction lining is subdivided into a plurality of individual brake lining elements which are resiliently mounted on the base plate by means of an elastically deformable intermediate plate disposed between the base plate and the friction brake lining.

One example of such a brake lining carrier is known from DE-PS 24 51 392, which disposes a stack of similar, lamellar intermediate plates which are uniform in thickness and which are mutually in contact with each other over their entire adjoining surfaces and are connected to each other. This stack of intermediate plates is solidly connected to the base plate and to the carrier plate for the lining in a suitable way, such as by bonding. The plurality of plates in the stack of intermediate plates does act to reduce the noise of the disk brake but absorbs considerable force such that the abrasive force exerted by the brake lining must be reduced comparable to disk brakes of other sizes. As a result, such disk brakes have reduced operating times between replacement of the linings. In addition, bonding the stack of intermediate plates between the plates themselves and to the base plate, as well as to the carrier plate requires considerable expense and the areas or spots of the bonds are sensitive to overheating.

In U.S. Pat. No. 2,451,326 there is disclosed a brake lining carrier which is provided with a rubber plate instead of the intermediate plates of the aforementioned brake lining carrier but has the same characteristics. The friction lining is divided into a number of individual brake shoes which are attached separately or in groups to carrier plates which are mounted onto a base plate with an intermediate rubber plate therebetween. As a result, the lining or individual shoes are moveable laterally but this is disadvantageous in that the rubber plate may become damaged as a result of heat generated during a long period of braking.

In another brake lining carrier structure instead of a rubber plate, an intermediate plate or a stack of several intermediate plates is provided and the intermediate plate or intermediate plates are corrugated. This corrugation imparts to the intermediate plates a certain degree of elasticity in a preferred direction of movement such that it is not possible to attain a uniform application of the friction lining shoe against the brake disk nor optimal noise suppression.

It is, therefore, the principal object of the present invention to provide a novel and improved brake lining carrier for disk brakes, particularly for rail vehicles having divided lining elements.

It is another object of the present invention to provide such a brake lining carrier wherein the brake lining elements are resiliently mounted but can be uniformly applied during braking.

It is a further object of the present invention to provide such a brake lining carrier which is simple and inexpensive in structure but which provides for uniform application of the brake lining against the brake disk.

It is an additional object of the present invention to provide such a brake lining carrier which provides for optimum suppression or reduction of noise during braking but which also can be used for a divided brake lining or individual brake shoes.

The objects of the present invention are achieved and the disadvantages of the prior art are overcome by providing a brake lining carrier having an intermediate plate between the base plate and lining carrier plate. This intermediate plate is provided with deformations protruding from a surface thereof and these deformations are arranged in a substantially regular pattern or are at least spaced substantially equally distant from each other. The indentations may be provided with various shapes such as that of a sphere, of a pyramid or planar walls, and there may be an opening in the bottom of the indentation. The edge of the indentation may be circular or some other preferred shape. The peripheral edge of the intermediate plate can be provided with recesses or notches to accommodate fastening elements which connect the base plate to the lining carrier.

According to one aspect of the present invention, a brake lining carrier or disk brakes having divided lining elements, particularly for rail vehicles, may comprise a base plate one side of which is detachably mountable on a brake lining support and on the other side of which is disposed an elastically deformable intermediate plate. A lining carrier plate to which is attached a divided brake lining element is then positioned on the intermediate plate. The intermediate plate is provided with a plurality of deformations protruding from a surface thereof and disposed in a substantially regular pattern and substantially the same distance from each other.

Other objects and advantages of the present invention will be apparent upon reference to the accompanying description when taken in conjunction with the following drawings, which are exemplary, wherein.

Proceeding next to the drawings, wherein like reference symbols indicate the same parts throughout the various views a specific embodiment and modification of the present invention will be described in detail.

Figure 1:
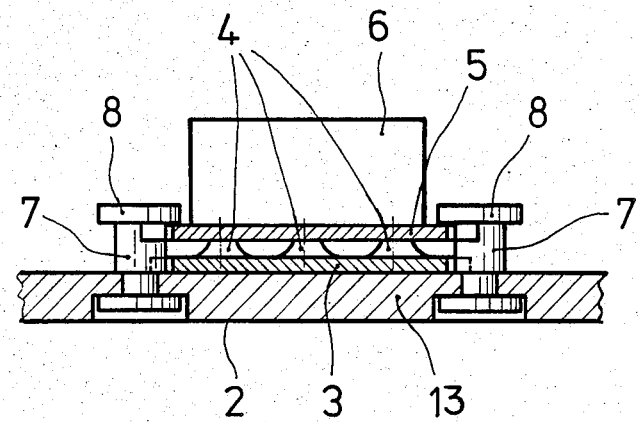
FIG. 1 is a sectional view of a brake lining carrier according to the present invention.

The brake lining carrier as shown in FIG. 1 has a base plate 1 one side 2 of which is adapted to be detachably mounted on a brake lining support member 13 of a brake rigging system which is known in the art. On the other side of base plate 1 there is positioned an intermediate plate 3 provided with a number of indentations to form bulges 4 on the side of the intermediate plate away from base plate 1 and which protrude from this plane or surface of the intermediate plate.

Supported on the bulges 4 is a lining carrier plate 5 on the other side of which is attached a brake friction lining 6. The peripheral edge of the carrier plate 5 outwardly of the friction lining 6 is provided with a plurality of semicircular shaped recesses or notches through which extend bolts 7 having heads 8 which overlap those portions of the carrier plate 6 adjacent the notches to secure the carrier plate to the base plate 1. When corresponding friction lining arrangements are repeated on one or both sides of the friction lining 6, the concept of the resulting structure will correspond substantially to the brake lining support disclosed US-PS U.S. Pat. No. 2,451,326, except for the intermediate plate 3 of the present invention.

Since the bulges 4 are elastically deformable to a limited degree, the friction lining 6 is elastically supported upon base plate 1 and is capable of limited movement. The bolts 7 which secure the brake lining 6 to the base plate 1 do not impede this elastically moveable movement. By incorporating the structure of the present invention the individual or divided brake lining shoes on the carrier plate 5 in no way impede or obstruct the movements of other shoes and, accordingly, a completely uniform application of the brake lining shoes against the brake disks is obtained. This structure is particularly suited for using friction lining brake shoes of sintered metal which are known to break off rather easily near their areas of friction with the brake disk. However, the application of uniform stress and the avoidance of reciprocating devices reduces this danger of breaking-off.

In addition to avoiding such breaking-off of the brake shoes, each individual brake lining shoe can be provided around its circumference by a perforated plate (not shown) which wears together with the friction lining or which gradually bends around and curls up corresponding to friction lining wear on the side away from the base plate 1.

As a result of tests conducted, including tests on laboratory test stands, it has been demonstrated that the brake lining carriers according to the present invention when provided with the particular shapes of the bulges 4, to be presently described, result in a very smooth, virtually noiseless braking. Also, there are no hot spots on the brake disk, the stress on the friction linings is thus completely uniform and long operating times for individual brake linings can be attained. Since the intermediate plate 3 with its bulges 4 requires only a limited thickness or height with respect to the brake lining carrier, it has been found that thicker brake linings having a greater and longer wear capacity can be used.

Figure 2:
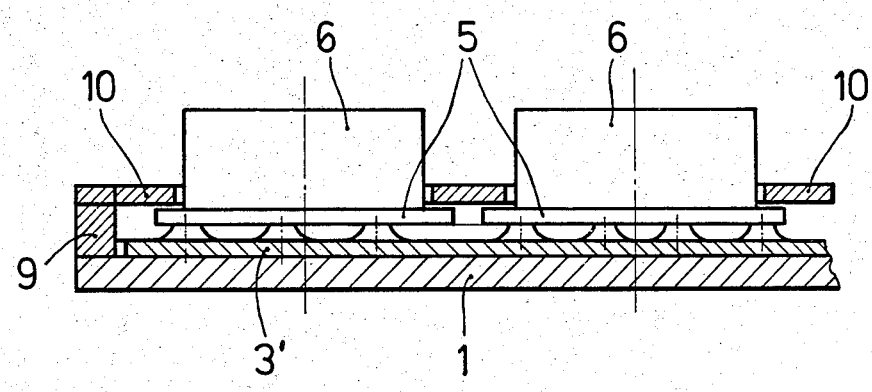
FIG. 2 is a sectional view of a modification of the brake lining carrier of FIG. 1.

In FIG. 2, the brake lining carrier is provided with a continuous intermediate plate 3' which supports several plates 5 each of which has attached thereto a brake lining or shoe 6. The edges of the carrier plates 5 which protrude outwardly from the edges of the brake linings 6 are overlapped by a perforated plate 10 which is connected to base plate 1 by spacers 9 and the friction linings 6 project through the openings of the perforated plate 10. Otherwise, the brake lining carrier of FIG. 2 corresponds in all respects to the brake lining carrier of FIG. 1 and exhibits the same functions and advantages.

The brake lining carrier of FIG. 2 may be provided with only a single intermediate plate 3', as in FIG. 1, to support a plurality of brake linings 6 mounted on carrier plates 5. Such an intermediate plate 3' is illustrated in FIG. 3 and in FIG. 4.

Figure 3:
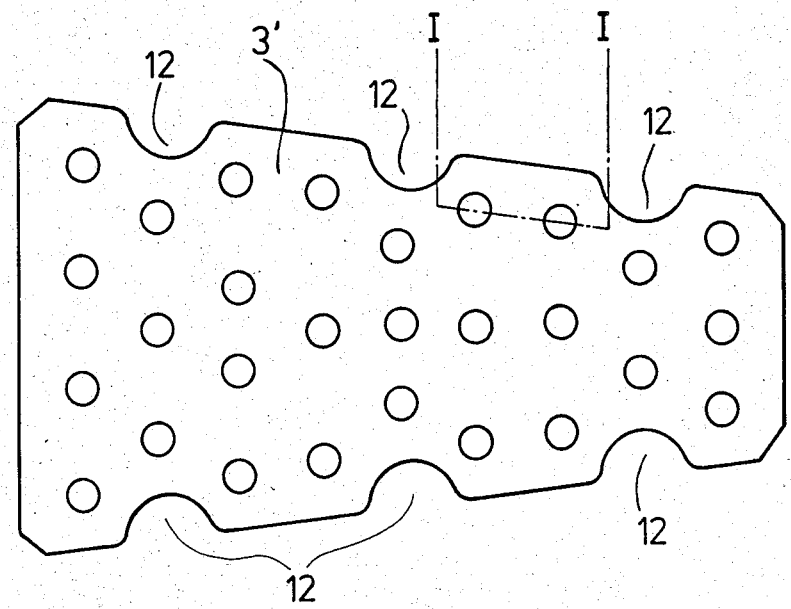
FIG. 3 is a plan view of an intermediate plate according to the present invention.
Figure 4:
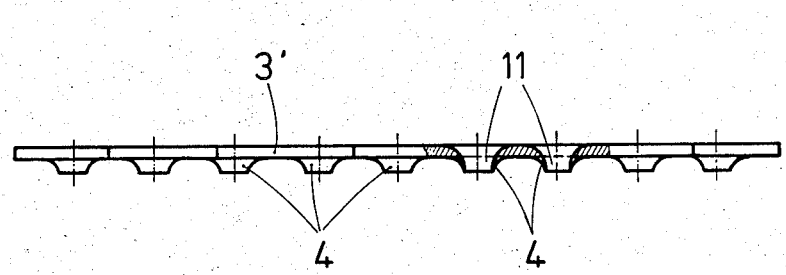
FIG. 4 is a side elevational view of the intermediate plate shown in FIG. 3 with a portion thereof illustrated in section taken along the line I—I of FIG. 3.
Figure 5:
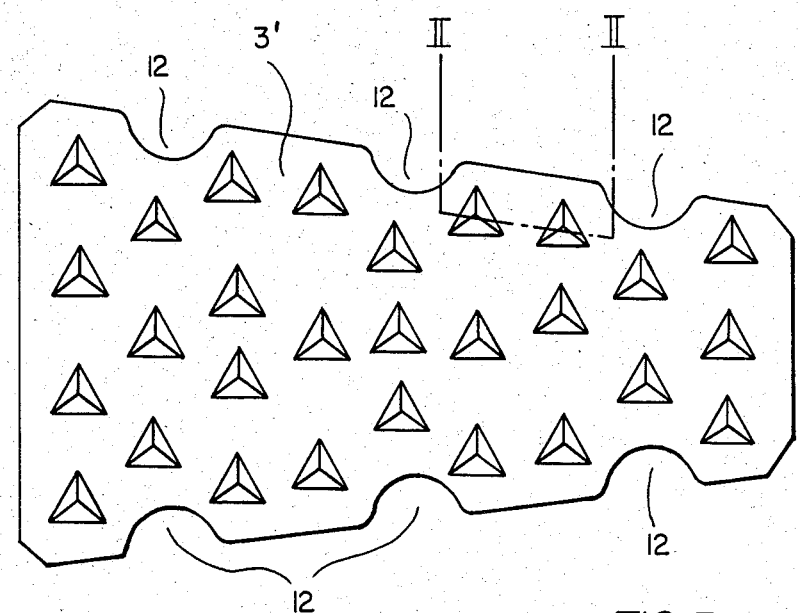
FIG. 5 is a plan view of an intermediate plate similar to that of FIG. 3 but showing a modification wherein the indentations have pyramid shapes.
Figure 6:
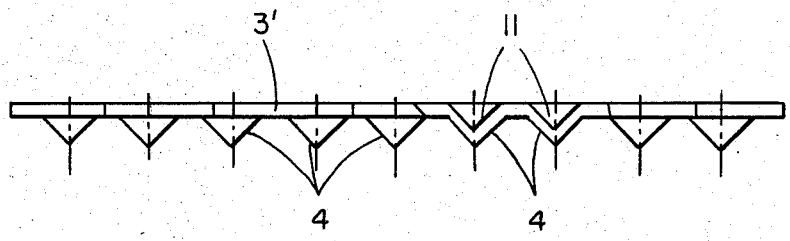
FIG. 6 is a side elevational view of the intermediate plate shown in FIG. 5 with a portion thereof illustrated in section taken along the line II—II of FIG. 5.
Figure 7:
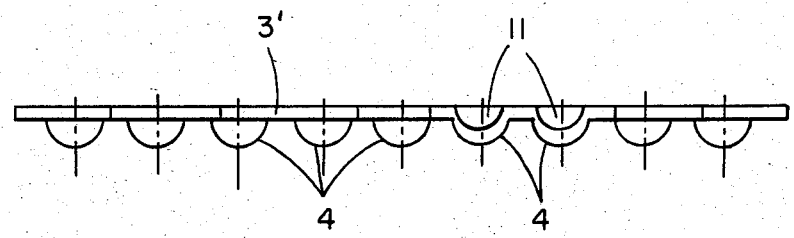
FIG. 7 is a view similar to that of FIG. 6 but showing the indentations having a spherical shape.

The intermediate plate 3', shown in FIGS. 3 and 4, is provided with a plurality of indentations in an approximately regular pattern in such a way that indentations 11 are spaced substantially equidistantly from each other. The impressions 11 may be formed by impressing on a surface of intermediate plate 3' with a tool that has a projection shaped like a spherical segment which would then produce an indentation with a circular peripheral edge and the resulting indentation would represent a portion of a sphere. Indentations may also be formed in the shape of a pyramid or with a plurality of planar walls such as to be a portion of a polyhedron. On the side of the intermediate plate 3', away from the tool, the indentations 11 form the bulges 4. The bottoms of the indentations are removed by punching, drilling, grinding or milling so as to form openings in the bottoms of the indentations 11 and the resulting intermediate plate 3' somewhat resembles a grater.

The elasticity of intermediate plate 3' is influenced by the total number of indentations 11 and/or the mutual distances between them, by the sizes of the indentations including both their diameters and their depth, by the size of the bottom openings of the indentations 11, as well as by the strength and material of the intermediate plate 3 in such a manner that the optimal characteristics of the brake lining carrier can be achieved. The substantially semicircular recesses 12 shown in FIG. 3 on both of the longer sides of intermediate plate 3' function as locations to accommodate fastening elements which may include the bolts 7 of FIG. 1, in order to fasten the carrier plate or plates to the base plate 1.

It is apparent that the indentations 11 can have shapes other than those described. Such shapes may be such as stars, crosses or any other geometric figures.

Another form of indentation comprises tongues formed in the intermediate plate on one or both sides thereof such as by punching and are then deformed or pushed outwardly from the plane of the plate. The intermediate plate can also be punched in a zigzag pattern which can be suitably bent or staggered. In any event, it is preferable that the formation and deformation of the intermediate plate itself and of the deformations and indentations are achieved in one operation. The intermediate plate can be inserted with the carrier plate or with protruding deformations which face the base plate.

The brake lining carrier according to the present invention is particularly advantageous to use for friction linings which are circular when viewed in plan and made of sintered metal. With such friction linings, the intermediate plate is circular which corresponds to the circular shape of the carrier plate. The fastening bolts for the friction lining can then be positioned centrally through the intermediate plate from the base plate to the carrier plate.

It will be understood that this invention is susceptible to modifications to adapt it to different usages and conditions and, accordingly, it is desired to comprehend such modifications within this invention as may fall within the scope of the appended claims.

What is claimed is:

1. A braking lining carrier for disk brakes having divided lining elements, particularly for rail vehicles, comprising a base plate having a first side and a second side, an elastically deformable intermediate plate having first and second plane surfaces and said first surface thereof directly positioned on said second side of said base plate, a carrier plate having one side positioned on said intermediate plate and having another side to which is attached a divided brake lining element, said intermediate plate having a plurality of deformations protruding only from said second plane surface thereof and disposed in a substantially regular pattern at substantially the same distance from one another, said deformations being elastically deformable to a limited degree such that said carrier plate and attached brake lining element is elastically supported upon said base plate and capable of limited movement.

2. A brake lining carrier as claimed in claim 1 wherein said deformations comprise indentations.

3. A brake lining carrier as claimed in claim 2 wherein said indentations are circular.

4. A brake lining carrier as claimed in claim 2 wherein said indentations have a spherical shape.

5. A brake lining carrier as claimed in claim 2 wherein said indentations have the shape of a pyramid.

6. A brake lining carrier as claimed in claim 2 wherein said indentations each has a bottom and there being an opening in the bottoms thereof.

7. A brake lining carrier as claimed in claim 6 wherein said openings are formed by one of drilling, punching, grinding and milling.

8. A brake lining carrier as claimed in claim 1 wherein said deformations comprise partially punched out tongues which are deformed from the surface of the intermediate plate.

9. A brake lining carrier as claimed in claim 1 wherein said intermediate plate has recesses along at least one edge thereof to accommodate fastening elements between the base plate and the carrier plate.

* * * * *